United States Patent

[11] 3,576,530

[72] Inventors William R. Buechler
Birmingham, Mich.;
Richard G. Marshall, Huntsville, Ala.
[21] Appl. No. 425,402
[22] Filed Jan. 14, 1965
[45] Patented Apr. 27, 1971
[73] Assignee Ford Motor Company
Dearborn, Mich.

[54] TURN INDICATOR SYSTEM ACTUATABLE BY EITHER OF TWO SWITCH MEANS
6 Claims, 5 Drawing Figs.
[52] U.S. Cl................................................... 340/81,
340/74, 200/61.27, 200/61.54
[51] Int. Cl.................................................. B60q 1/26
[50] Field of Search.......................................... 340/74, 81,
73, 54; 315/81; 200/61.27, 61.54

[56] References Cited
UNITED STATES PATENTS

| | | | |
|---|---|---|---|
| 1,244,990 | 10/1917 | Koch | 340/74 |
| 2,249,375 | 7/1941 | Day | 200/61.27 |
| 2,863,015 | 12/1958 | Ahrens | 200/61.54 |
| 2,999,911 | 9/1961 | Dryer | 200/61.54 |
| 3,002,127 | 9/1961 | Grantkowski | 340/81 |
| 2,108,454 | 2/1938 | Steinman | 340/54 |
| 2,188,058 | 1/1940 | Metcalf | 340/54 |
| 2,674,667 | 4/1954 | DeFillips | 340/54 |

Primary Examiner—Alvin H. Waring
Attorneys—John R. Faulkner and Keith L. Zerschling CLAIM: CLAIM 1. A turn signal system for an automotive vehicle comprising a steering wheel, a source of electrical energy, a flasher, a first turn signal lamp mounted on one side of said vehicle, a second turn signal lamp mounted on the other side of said vehicle, a turn signal switch having an open and two different closed positions for coupling either said first turn signal lamp or said second turn signal lamp to said source of electrical energy through said flasher to a selected one of said closed positions, means coupled to said steering wheel and to said turn signal switch for opening said turn signal switch if closed as said steering wheel is returned toward a neutral position after the completion of a turn, a first pushbutton switch means mounted on said steering wheel coupling said first turn signal lamp to said source of electrical energy through said flasher when manual pressure is applied to said first pushbutton switch means, a second pushbutton switch means mounted on said steering wheel at the opposite side from said first pushbutton switch means and coupling said second turn signal lamp to said source of electrical energy through said flasher when manual pressure is applied to said second pushbutton means.

RICHARD G. MARSHALL
WILLIAM R. BUECHLER
*INVENTORS*

BY John R. Faulkner
Keith L. Zerschling
*ATTORNEYS*

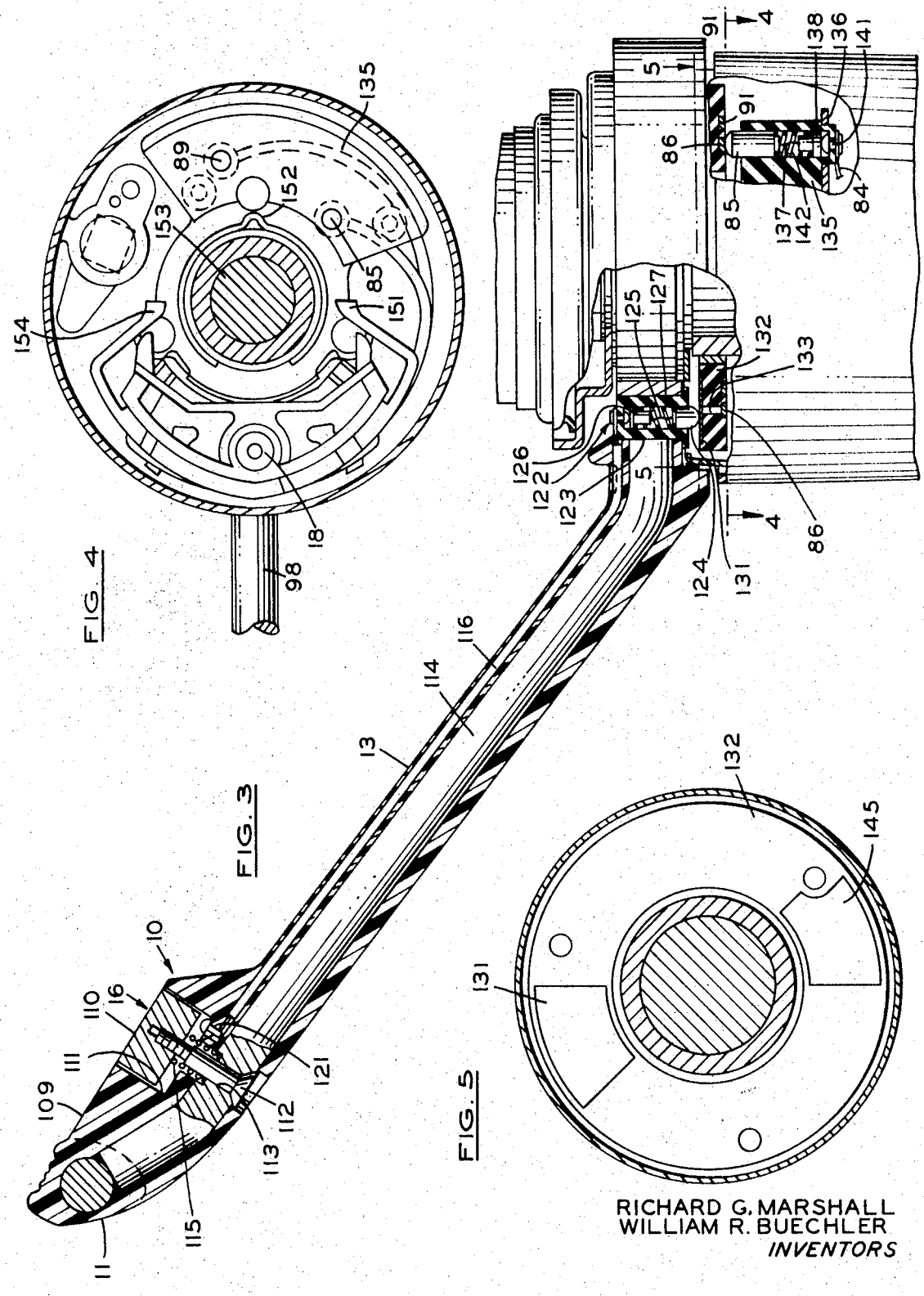

TURN INDICATOR SYSTEM ACTUATABLE BY EITHER OF TWO SWITCH MEANS

This invention relates to a turn signaling system for an automotive vehicle and more particularly to such a system in which the driver of the vehicle may indicate conveniently his intention to switch lanes on a multiple land roadway or to complete other short turn maneuvers without removing his hands from the steering wheel.

In conventional turn signaling systems for automotive vehicles, there is provided a turn signal switch operated by a lever positioned immediately below the steering wheel. When this lever is operated, the turn signal switch is locked into an on-position to indicate either a left- or a right-hand turn. The switch will remain on and the turn signal will be flashed until the driver completes the turn and moves the steering wheel back to its neutral position. At this time, a cam on the steering wheel shaft will engage a follower on the turn signal switch and return the switch to the neutral position.

In modern day vehicle driving, particularly that done on turnpikes, freeways and expressways that have multiple lanes in each direction, a driver often needs to switch lanes during the course of his travels and he should indicate his intention to do so to the drivers traveling behind him. In order to do this, however, in conventional automotive vehicles, the driver must move the turn signal switch to the on-position and must normally move it back to the off-position manually since the turn is ordinarily so shallow that the cam on the steering wheel shaft does not properly engage the follower on the turn signal switch to return it to the neutral position.

In the present invention, means are provided for permitting the vehicle operator to momentarily energize the turn signal lamps of the vehicle without removing his hands from the steering wheel. In order to do this, pushbutton switches are mounted in the steering wheel, preferably in the spokes thereof, that may be actuated to energize the turn signal lamps on either side of the vehicle as long as the vehicle operator applies manual pressure thereto. These switches are integrated with the remainder of the turn signal system including a conventional turn signal switch modified to provide single-pole, double-throw operation. This provides a compact, integrated unit and circuit embodying a minimum of parts that will serve not only to indicate turns in the conventional or normal way, but will also permit the vehicle driver to momentarily energize the turn signal lamps to indicate a shallow turn or a switch in lanes on a multiple-lane highway.

An object of the present invention is the provision of a turn signal system for an automotive vehicle that will permit the vehicle operator to momentarily energize the vehicle turn signals or lamps without removing his hands from the steering wheel.

A further object of the invention is the provision of a turn signal system for an automotive vehicle that will permit the operator to momentarily energize the turn signal lamps to indicate a shallow turn maneuver or a switch in lanes on a multiple-lane highway.

A further object of the invention is the provision of a turn signal system for an automotive vehicle that will permit the vehicle operator to signal a turn in the normal conventional fashion and will also permit him to momentarily energize the turn signals or lamps to indicate a shallow turn or lane-switching maneuver.

Still another object of the invention is the provision of an integrated, uncomplicated ad inexpensive turn signal system for an automotive vehicle that will permit the vehicle operator to signal turns in the normal or conventional fashion and will also permit him to momentarily energize the turn signal lamps of the automotive vehicle to indicate a shallow turn or a lane-switching maneuver.

Other objects and attendant advantages of the present invention may be more readily realized when the specification is considered in connection with the attached drawings in which:

FIG. 3 is a sectional view partially in elevation of the steering wheel of the present invention and taken partly along a spoke of the steering wheel of FIG. 1;

FIG. 4 is a view taken along the lines 4—4 of FIG. 3; and

FIG. 5 is a view taken along the lines 5—5 of FIG. 3.

Figure 1:
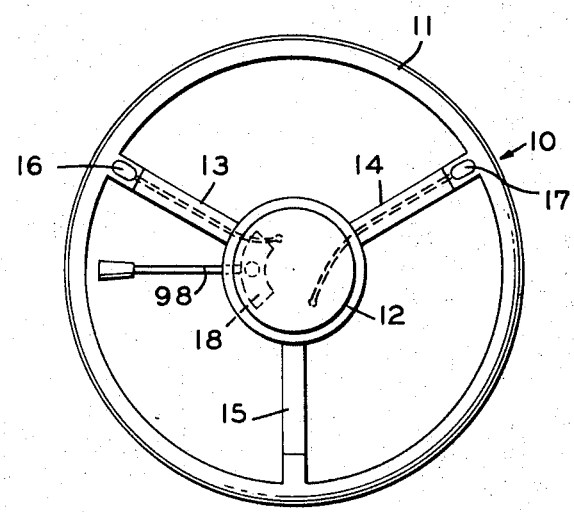
FIG. 1 is a plan view of a steering wheel that includes a portion of the turn signal system of the present invention.

Referring now to the drawings in which like reference numerals designate like parts throughout the several views thereof, there is shown in FIG. 1 a steering wheel 10 of an automotive vehicle having a rim portion 11 connected to a hub 12 through a plurality of spokes 13, 14 and 15. As will be described in greater detail later in the specification, the spokes 13 and 14 have pushbutton switches 16 and 17 mounted therein and the hub 12 of the steering wheel 10 has associated therewith a conventional turn signal switch indicated by the numeral 18.

Figure 2:
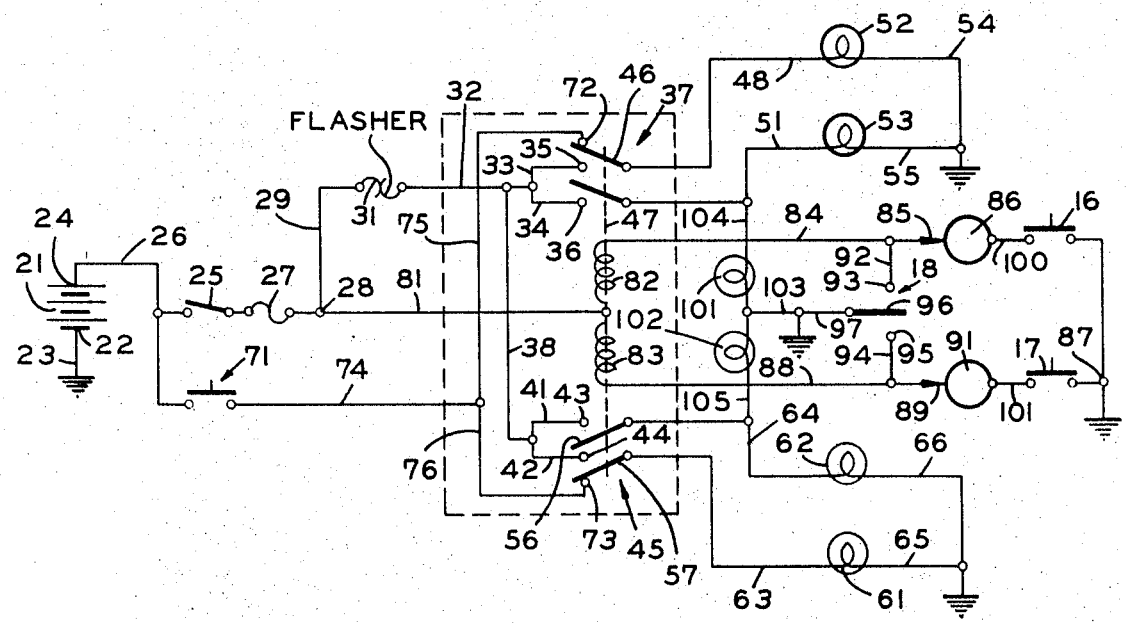
FIG. 2 is a circuit diagram of the present invention.

Referring now to FIG. 2 that shows a circuit diagram of the present invention, there is shown a source of electrical energy 21 having a negative terminal 22 connected to ground through a lead 23 and a positive terminal 24 connected to an ignition switch 25 through a lead 26. The ignition switch 25 is in turn connected through a fuse 27 to a junction 28. The junction 28 is connected through lead 29 to a conventional flasher 31. The flasher 31 is in turn connected through leads 32, 33 and 34 to contacts 35 and 36 of relay 37. The flasher 31 is also connected through lead 32 and leads 38, 41 and 42 to contacts 43 and 44 of a second relay 45.

Movable arms 46 and 47 of the relay 37 are connected through leads 48 and 51 to the left rear turn signal lamp 52 and the left front turn signal lamp 53 respectively. These two turn signal lamps 52 and 53 are mounted on the automotive vehicle body of the left-hand side thereof in the front and rear of the vehicle and they are connected to ground through leads 54 and 55.

Similarly, the movable arms 56 and 57 of the relay 45 are connected to the right rear turn signal lamp 61 and the right front turn signal lamp 62 through leads 63 and 64 respectively. The two turn signal lamps 61 and 62 are mounted on the right-hand side of the vehicle to the front and rear thereof and are connected to ground through leads 65 and 66.

A stop lamp switch 71 has one terminal connected to the positive terminal 24 of the source of electrical energy 21 through the lead 26 and has the other terminal thereof connected to stationary contacts 72 and 73 of the relays 37 and 45 respectively through leads 74, 75 and 76.

The junction 28 that is connected to fuse 27 is also connected through lead 81 with terminals of windings 82 and 83 of relays 37 and 45 respectively. The other terminal of winding 82 is connected through lead 84 to a slip ring brush 85 that is in engagement with a slip ring 86. The slipring 86 is in turn coupled to one terminal of pushbutton switch 16 through an electrical connection 100 that will be described in greater detail later. The other terminal of pushbutton switch 16 is connected to ground through an electrical connection 87. Similarly the other terminal of winding 83 is connected through lead 88 to brush 89 engaging slipring 91. The slipring 91 in turn is connected to one terminal of pushbutton switch 17 through an electrical connection 101. The other terminal of pushbutton switch 17 is connected to ground through the electrical connection 87.

The lead 84 from the winding 82 of relay 37 is also connected through lead 92 to a contact 93 of a conventional turn signal switch 18 that may be modified to a single-pole double-throw switch arrangement. The winding 83 and lead 88 are similarly connected through lead 94 to contact 95 of the turn signal switch 18. As shown schematically, this turn signal switch 18 has a movable arm 96 connected to ground through lead 97 that may be connected to either contact 93 or 95 by movement of the turn signal switch lever 98 shown in FIG. 1. The pilot or indicator lights 101 and 102 of the system have a central connection to ground through lead 103. The pilot or indicator lamp 101 is also connectable to lead 34 and the movable arm 47 of the relay 37 through a lead 104 and is thus connectable to the source of electrical energy 21 through flasher 31. The pilot or indicator lamp 102 is connectable to lead 38 and the movable arm 56 of relay 45 through lead 105 and thus is connectable to the source of electrical energy 21 through flasher 31.

Referring now to FIG. 3, there is shown in a section through one of the spokes of the steering wheel 10, for example, through the spoke 13 and a partial sectional view through the hub of the steering wheel. The pushbutton switch 16 takes the form of an actuating member 110 positioned within a chamber 111 in the plastic body 109 of the steering wheel 10. The actuating member 110 is constructed of a conducting material and is mounted on a bolt 112 that in turn is slidably mounted in a bore 113 in metal reinforcing member 114 of the spoke 13. A conducting spring 115 engages the spoke 114 and the actuating member 110. A lead 116 connects a contact 121 mounted in the plastic body 109 of the steering wheel 10 in position to be engaged by the actuator 110 when it is depressed against the bias of the conducting spring 115 to a brush mechanism 122 positioned in a plastic holder 123.

The brush mechanism 122 includes a brush 124 connected through lead 125 to an inner contact member 126 that in turn engages a rivet connected to lead 116. The brush 124 is biased by the spring 127 into engagement with a conducting segment 131 on an annular plastic body member 132. The conducting segment 131 is connected via a conducting rivet 133 to slipring 86.

The brush 85 shown in FIGS. 2 and 3 engages the slipring 86 carried by the annular plastic body member 132 and is positioned within a plastic housing 135 supported by a structural member 136. This brush is connected to the lead 84 through a through a lead 137, an inner contact member 138 and a rivet 141. A spring 142 biases the brush 85 into engagement with the slipring 86.

It should be understood that the spoke 14 of the steering wheel 10 has a similar structure positioned therein and that a second brush 89 is positioned within the plastic housing 135 and engages the slipring 91. This can readily be appreciated by an inspection of FIG. 4 that shows the two brushes 85 and 89 mounted in the plastic housing 135. Also a brush similar to the brush 124 is mounted in the spoke 14 of the steering wheel 10 and it engages the conducting segment 145 of the slipring structure 132.

It has been stated in relation to the description of the circuit diagram of FIG. 2 that an electrical connection 100 connects the slipring 86 with the pushbutton switch 16. It can be appreciated by an inspection of FIG. 3 that the electrical connection 100 includes the conducting rivet 133 and conducting segment 131 carried by the annular plastic body member 132, the brush mechanism 122 and the lead 116. The electrical connection 87 that the metal member 114 of the spoke 13 of the steering wheel 10. The metal member 114 is electrically connected to the remainder of the vehicle chassis and that serves as an electrical ground.

The turn signal switch mechanism 18 with its lever 98 is shown in elevation in FIG. 4. When the lever 98 is moved in one direction, for example, downwardly as shown in FIG. 4, the movable arm 96 shown in FIG. 2 will engage the contact 93 and a flexible arm or follower 151 will move into position to be engage by a cam 152 on steering shaft 153 that is connected to the steering wheel 10. The flexible follower or arm 151 will move the switch back into its neutral position as the steering wheel 10 is returned to a neutral position after the execution of a left-hand turn. Similarly, a flexible follower 154 is provided on the switch mechanism 18 that will be operative with the cam 155 to return the switch member to a neutral position when a right-hand turn has been completed and the steering wheel moves to a neutral position. Such an arrangement is more fully disclosed in U.S. PAT. No. 2,999,911, issued Sept. 12, 1961 to P.J. Dryer, et at.

The left rear turn signal lamp 52 and the right rear turn signal lamp 61 serve as stop lamp switches since the depression of the stop lamp switch 71 actuated by the vehicle brake pedal will energize these two lamps on a continuous basis when the turn signal switch 18 and the two pushbutton switches 16 and 17 are in the open or neutral position. The circuit from the stop lamp switch 71 to the right rear turn signal lamp 61 may be traced through the lead 74, lead 76, contact 73, arm 57 of relay 45, and lead 63. Similarly, the circuit to the left rear turn signal 52 may be traced from the stop lamp switch 71 through lead 74, lead 75, contact 72, movable arm 46 of relay 37, and lead 48.

In the operation of the turn signal system of the present invention, it can be readily appreciated that, if the operator wishes to signal a left-hand turn, he may do so by moving the turn signal switch lever 98 downwardly. This will move the movable arm 96 into contact with the contact 93 and a circuit will be completed from the source of electrical energy 21 through the winding 82 of the relay 37 to ground via ignition switch 25, fuse 27, lead 81, the winding 82, lead 84, lead 92, contact 93, movable arm 96 and lead 97. The energization of the winding 82 will move the movable arms 46 and 47 into engagement with the contacts 35 and 36 respectively thereby completing a circuit from the source of electrical energy through ignition switch 25, fuse 27, lead 29, flasher 31, lead 32, leads 33 and 34, contacts 35 and 36, movable arms 46 and 47 and leads 48 and 51 to the turn signal lamps 52 and 53 thereby causing these lamps 52 and 53 that are mounted on the left-hand side of the vehicle to be flashed by the flasher 31. It can be appreciated that at this time the contact 72 that is connected through leads 75 and 74 to the stop lamp switch 71 is disconnected from the left-hand rear turn signal lamp 52 thereby disabling the stop lamp switch 72 from operating the lamp 52 when the turn signal switch 18 has been actuated to indicate a left-hand turn. At the same time, the indicator lamp or pilot lamp 101 will be energized from the flasher 31 through the movable arm 47 of relay 37 and through leads 57 and 104.

In the alternative, should the vehicle operator wish to signal a left-hand turn only momentarily when he wishes to execute a shallow turn maneuver such as lane switching (where the steering wheel 10 would not be turned sufficiently to cancel the turn signal switch 18 should that be actuated) he may depress the actuator 110 of the pushbutton switch 116 so that it comes into engagement with contact 121. This will energize the relay winding 82 through the circuit previously described with the exception that the one end of the winding 82 will now be grounded through the lead 84, the brush 85, the slipring 86, the conductive rivet 133 and conductive segment 131 on the annular plastic body member 132, the brush mechanism 122, lead 116, contact 121, actuator 110, conductive spring 115 and the metallic member 114 of spoke 13. This will cause the turn signal lamps 52 and 53 to be energized from the source of electrical energy 21 through the flasher 31 since the movable arms 46 and 47 of the relay 37 will come into engagement with the contacts 33 and 34. The turn signal lamps 52 and 53 will remain energized as long as the operator maintains pressure on the switch 16 to keep the actuator 110 in engagement with the contact 121.

It can readily be appreciated that in signaling a right-hand turn by use of the turn signal switch 18 that exactly the same operation takes place except that the relay winding 83 is energized by the movement of movable arm 86 into engagement with contact 95. As a result, the movable arms 56 and 57 of this relay are moved into engagement with contacts 43 and 44 to energize the right-hand turn signal lamps 61 and 62 through the flasher 31. At this time, the pilot or indicator lamp 102 is energized through the flasher 31 by the circuit previously described. If the vehicle operator wishes to energize momentarily the right-hand turn signal lamps 61 and 62, he may do so by depressing the pushbutton switch 17.

It can readily be appreciated, therefore, that the present invention provides a simple, inexpensive and integrated turn signal system that may be employed to momentarily energize the turn signal lamps of the vehicle for shallow turns or lane switching maneuvers. At the same time, the invention provides for conventional actuation of the turn signals by a turn signal switch that will be canceled when the steering wheel is returned to the neutral position.

It is to be understood that this invention is not to be limited to the exact construction shown and described but that various changes and modifications may be made without departing from the spirit and scope of the invention as defined in the appended claims.

We claim:

1. A turn signal system for an automotive vehicle comprising a steering wheel, a source of electrical energy, a flasher, a first turn signal lamp mounted on one side of said vehicle, a second turn signal lamp mounted on the other side of said vehicle, a turn signal switch having an open and two different closed positions for coupling either said first turn signal lamp or said second turn signal lamp to said source of electrical energy through said flasher when moved to a selected one of said closed positions, means coupled to said steering wheel and to said turn signal switch for opening said turn signal switch as said steering wheel is returned toward a neutral position after the completion of a turn, a first pushbutton switch means mounted on said steering wheel coupling said first turn signal lamp to said source of electrical energy through said flasher when manual pressure is applied to said first pushbutton switch means, a second pushbutton switch means mounted on said steering wheel at the opposite side from said first pushbutton switch means and coupling said second turn signal lamp to said source of electrical energy through said flasher when manual pressure is applied to said second pushbutton means.

2. In a turn signal system for an automotive vehicle, a turn signal lamp mounted on one side of said vehicle, a source of electrical energy, a relay having a winding and a movable arm movable between a first position in which said relay winding is not energized and a second position in which said relay winding is energized, a steering wheel, a turn signal switch mounted adjacent said steering wheel and movable from a neutral position to a closed position for completing a circuit from said source of electrical energy through said relay winding, said turn signal switch including means cooperating with means operated by said steering wheel for returning said turn signal switch to said neutral position when said steering wheel is returned toward a neutral position after the completion of a turn, a flasher, circuit means completing a circuit from said source of electrical energy through said flasher and the movable arm of said relay when said relay winding is energized and said movable arm moves into said second position, a pushbutton switch in parallel circuit arrangement with said turn signal switch and mounted one said steering wheel for completing a circuit from said source of electrical energy through said relay winding when manual pressure is applied to said pushbutton switch, said turn signal lamp being energized from said source of energy through said flasher and the movable arm of said relay during the time manual pressure is applied to said pushbutton switch means.

3. In a turn signal system for an automotive vehicle, a first turn signal lamp mounted on one side of said vehicle, a second turn signal lamp mounted on the other side of said vehicle, a source of electrical energy, a first relay having a winding and a movable arm movable from a first position to a second position when said relay winding is energized, a second relay having a winding and a movable arm movable from a first position to a second position when said winding is energized, a steering wheel, a turn signal switch mounted adjacent said steering wheel and movable from a neutral position to one of two closed positions for completing a circuit from said source of electrical energy through either the winding of said first relay when moved to its first closed position or the winding of said second relay when moved to its second closed position said turn signal switch including means cooperating with means operated by said steering wheel for returning said switch to said neutral position when said steering wheel is returned toward a neutral position after the completion of a turn, a flasher, first circuit means completing a circuit from said source of electrical energy to said first turn signal lamp through said flasher and the movable arm of said first relay when said winding of said first relay is energized and said movable arm of said first relay moves into said second position, second circuit means completing a circuit from said source of electrical energy to said second turn lamp through said flasher and the movable arm of said second relay when the winding of said second relay is energized and the movable arm of said second relay moves into said second position, a first pushbutton switch in parallel circuit arrangement with said first circuit mean and mounted on said steering wheel for completing a circuit from said source of electrical energy through the winding of said first relay when manual pressure is applied to said first pushbutton switch means, said first turn signal lamp being energized from said source of energy through said flasher and the movable arm of said first relay, a second pushbutton switch in parallel circuit arrangement with said second circuit means and mounted on said steering wheel for completing a circuit from said source of electrical energy through the winding of said second relay as long as manual pressure is applied to said second pushbutton switch means, said second turn signal lamp being energized from said source of electrical energy through said flasher and the movable arm of said second relay.

4. In a turn signal system for an automotive vehicle having a steering wheel, a first turn signal lamp mounted on one side of said vehicle, a second turn signal lamp mounted on the other side of said vehicle, a source of electrical energy, a flasher, a turn signal switch movable between an unactuated position and two different actuated positions, circuit means coupling said source of electrical energy, said flasher, said turn signal switch and turn signal lamp and completing a circuit from said source of electrical energy to a selected one of said turn signal lamps through said flasher in accordance with which one of said two actuated positions said turn signal switch has been moved to, means coupled to said steering wheel and operative to return said turn signal switch to said unactuated position when said steering wheel is returned toward neutral position after the completion of a turn, a first pushbutton switch means mounted on said steering wheel and coupled to said circuit means for causing said circuit means to complete a circuit from said source of electrical energy to said first turn signal lamp through said flasher when manual pressure is applied to said first pushbutton switch means, and second pushbutton switch means mounted on said steering wheel and coupled to said circuit means for causing said circuit means to complete a circuit from said source of electrical energy to said second turn signal lamp through said flasher when manual pressure is applied to said second pushbutton switch means.

5. In a turn signal indicating system for an automotive vehicle, a turn signal lamp mounted on one side of said vehicle, a source of electrical energy, a flasher, first manual switch means having contacts operable to open position and closed position, said switch means for coupling said turn signal lamp to said source of electrical energy through said flasher when moved to said closed position, a steering wheel, means operable to automatically open said first manual switch means when said steering wheel is returned toward the center position after completion of a turn, second manual switch means mounted on said steering wheel having normally open switch contacts, a bypass circuit around said contacts of said first manual switch means, said second manual switch means operable to energize said bypass circuit to connect said turn signal lamp to said source of electrical energy through said flasher when manual pressure is applied to said second manual switch means to close its switch contacts.

6. In a turn signal indicating system for an automotive vehicle, a turn signal lamp mounted on one side of said vehicle, a source of electrical energy, a flasher, a turn signal switch having contacts operable between an unactuated position and an actuated position, circuit means coupling said source of electrical energy, said flasher, said turn signal switch, and said turn signal lamp and completing a circuit from said source of electrical energy to said turn signal lamp through said flasher when said turn signal switch is in said actuated position, a steering wheel, means operable to automatically move said turn signal switch from said actuated position to said unactuated position when said steering wheel is returned toward the center position after completion of a turn, pushbutton switch means mounted on said steering wheel having normally open switch contacts, a bypass circuit around said contacts of said turn signal switch, said pushbutton switch means operable to energize said bypass circuit to complete a circuit from said source of electrical energy to said turn signal lamp through said flasher when manual pressure is applied to said pushbutton switch means to close its switch contacts.